United States Patent
Lobisser et al.

(10) Patent No.: US 12,071,267 B2
(45) Date of Patent: Aug. 27, 2024

(54) SYSTEM, APPARATUS, AND METHOD FOR OZONE-CONTAINING VACUUM STORAGE OF PERISHABLE PRODUCTS

(71) Applicant: Ripelocker LLC, Bainbridge Island, WA (US)

(72) Inventors: George Frank Lobisser, Bainbridge Island, WA (US); Thomas Owen Mitchell, Bainbridge Island, WA (US); Yong-Ki Kim, Yakima, WA (US)

(73) Assignee: Ripelocker LLC

( * ) Notice: Subject to any disclaimer, the term of this patent is extended or adjusted under 35 U.S.C. 154(b) by 0 days.

(21) Appl. No.: 18/309,487

(22) Filed: Apr. 28, 2023

(65) Prior Publication Data
US 2023/0312151 A1    Oct. 5, 2023

Related U.S. Application Data

(63) Continuation-in-part of application No. 17/360,892, filed on Jun. 28, 2021, which is a continuation-in-part
(Continued)

(51) Int. Cl.
*B65B 31/02* (2006.01)
*A23B 7/152* (2006.01)
(Continued)

(52) U.S. Cl.
CPC ............ *B65B 31/025* (2013.01); *A23B 7/152* (2013.01); *B65B 25/001* (2013.01); *B65D 81/2038* (2013.01); *B65D 85/34* (2013.01)

(58) Field of Classification Search
CPC ... B65B 31/025; B65B 25/001; B65B 25/041; B65D 81/2038; B65D 85/34;
(Continued)

(56) References Cited

U.S. PATENT DOCUMENTS 2,890,810 A   6/1959   Gisela
3,085,913 A   4/1963   Caswell
(Continued)

OTHER PUBLICATIONS

Dickson et al., "Abatement of Ethylene by Ozone Treatment in Controlled Atmosphere Storage of Fruits and Vegetables", Paper No. 92-6571, presented at the 1992 International Winter Meeting sponsored by the American Society of Agricultural Engineers, 9 pages.
(Continued)

*Primary Examiner* — Regina M Yoo
(74) *Attorney, Agent, or Firm* — AEON Law, PLLC; Adam L. K. Philipp; Ki Yong O

(57) ABSTRACT

Methods, apparatus, and system for storing perishable products in a vacuum container. An atmosphere control system is coupled to the vacuum container for measuring and maintaining controlled atmospheric conditions within the vacuum container. The atmosphere control system includes a plurality of monitors configured to monitor atmospheric conditions within the vacuum container. The atmosphere control system further includes a vacuum pump configured to reduce total absolute pressure in the vacuum chamber to below a total gas pressure limit, an ozone generator configured to generate gaseous ozone, and an inlet valve coupled to the ozone generator and configured to admit an ozone-containing gas into the vacuum container.

9 Claims, 10 Drawing Sheets

Related U.S. Application Data of application No. 17/176,063, filed on Feb. 15, 2021, application No. 18/309,487 is a continuation-in-part of application No. 17/176,063, filed on Feb. 15, 2021, which is a continuation of application No. 15/923,611, filed on Mar. 16, 2018, now Pat. No. 11,008,151, and a continuation of application No. 15/923,529, filed on Mar. 16, 2018, now Pat. No. 10,919,656.

(60) Provisional application No. 62/472,316, filed on Mar. 16, 2017, provisional application No. 62/472,284, filed on Mar. 16, 2017.

(51) Int. Cl.
  *B65B 25/00* (2006.01)
  *B65D 81/20* (2006.01)
  *B65D 85/34* (2006.01)

(58) Field of Classification Search
  CPC ......... B65D 81/20; A23B 7/144; A23B 7/152; A23L 3/3409; A23L 3/34095; A23L 3/3445
  See application file for complete search history.

(56) References Cited

U.S. PATENT DOCUMENTS

| | | | |
|---|---|---|---|
| 3,418,783 A | 12/1968 | Collons | |
| 3,419,893 A | 12/1968 | Vahlstrom | |
| 5,261,976 A | 11/1993 | Schultz | |
| 5,983,830 A * | 11/1999 | Cox | A01K 45/007 119/6.8 |
| 6,962,654 B2 | 11/2005 | Arnaud | |
| 8,783,002 B2 * | 7/2014 | Bowden | A23L 3/3418 426/316 |
| 10,759,588 B1 | 9/2020 | Lobisser et al. | |
| 2002/0085950 A1 | 7/2002 | Robitaille et al. | |
| 2003/0173276 A1 * | 9/2003 | Arnaud | B01D 21/245 210/150 |
| 2007/0258855 A1 | 11/2007 | Turcot et al. | |
| 2009/0230012 A1 | 9/2009 | Choy et al. | |
| 2010/0200599 A1 | 8/2010 | Molthen et al. | |
| 2011/0132801 A1 | 6/2011 | Elder | |
| 2011/0247622 A1 | 10/2011 | Schneider et al. | |
| 2013/0156912 A1 | 6/2013 | Espinosa | |
| 2015/0108037 A1 | 4/2015 | Evans et al. | |
| 2021/0163165 A1 | 6/2021 | Lobisser et al. | |
| 2023/0312151 A1 | 10/2023 | Lobisser et al. | |

OTHER PUBLICATIONS

Karaca et al., "Effect of continuous 0.3 μL/L gaseous ozone exposure on fungicide residues on table grape berries", Postharvest Biology and Technology, vol. 64, 2012, pp. 154-159.

* cited by examiner

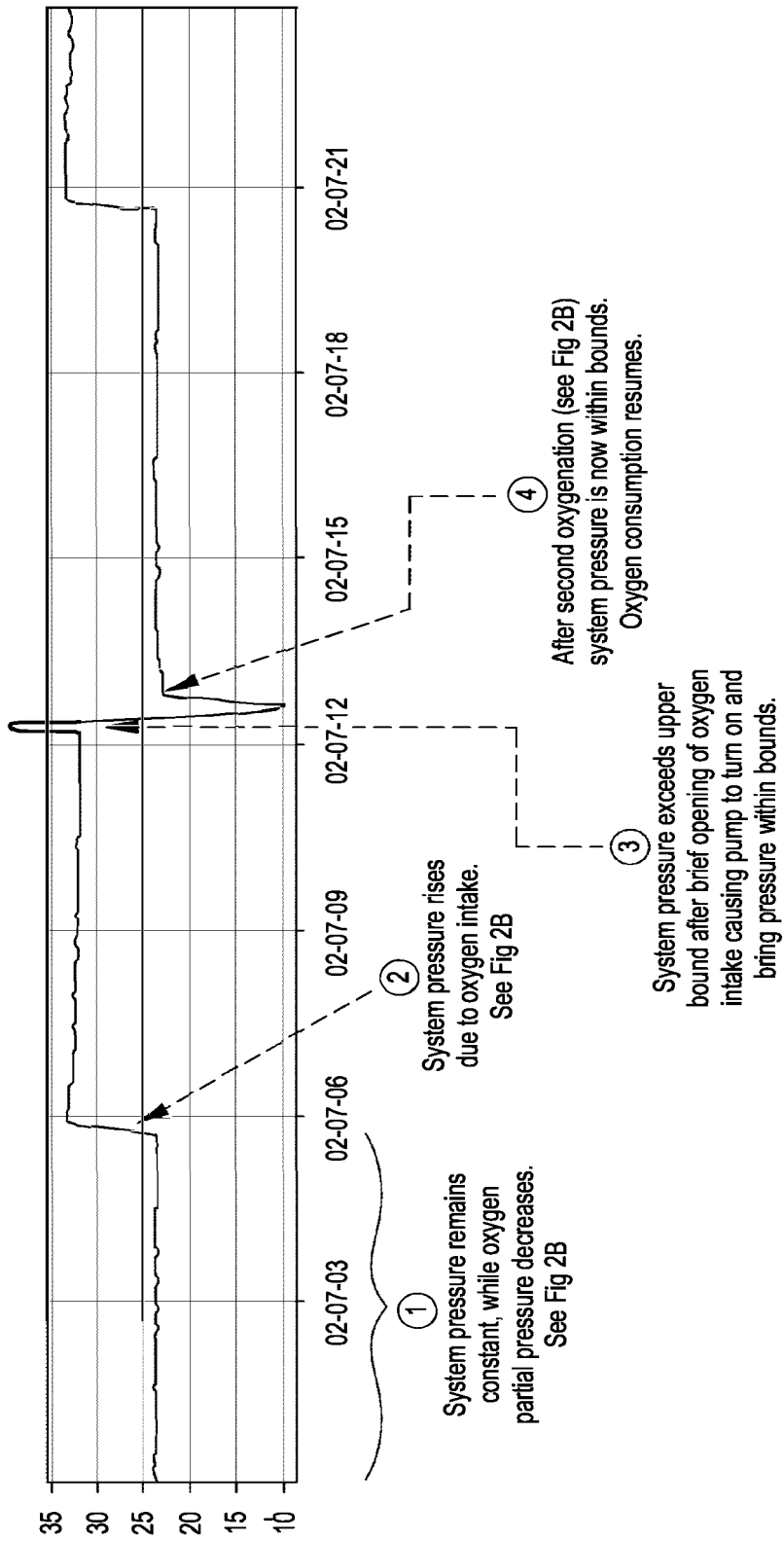

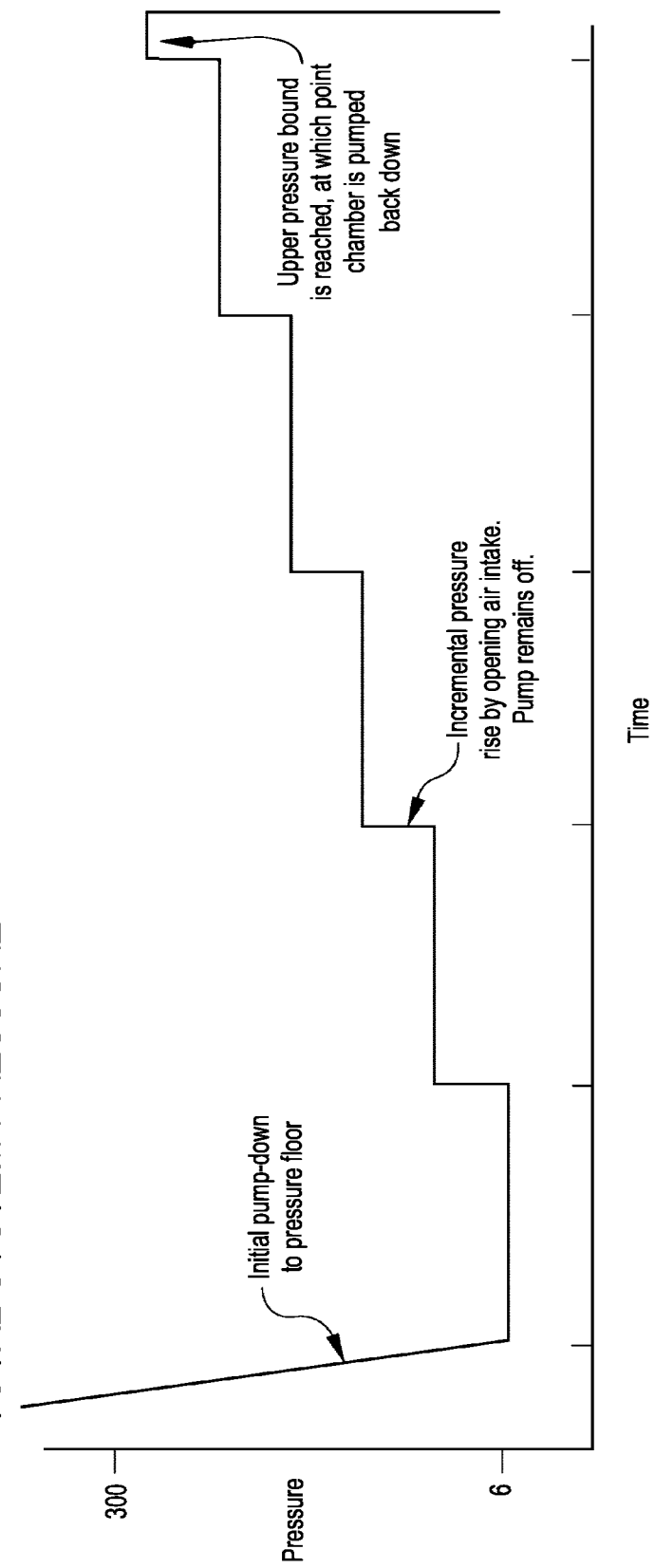

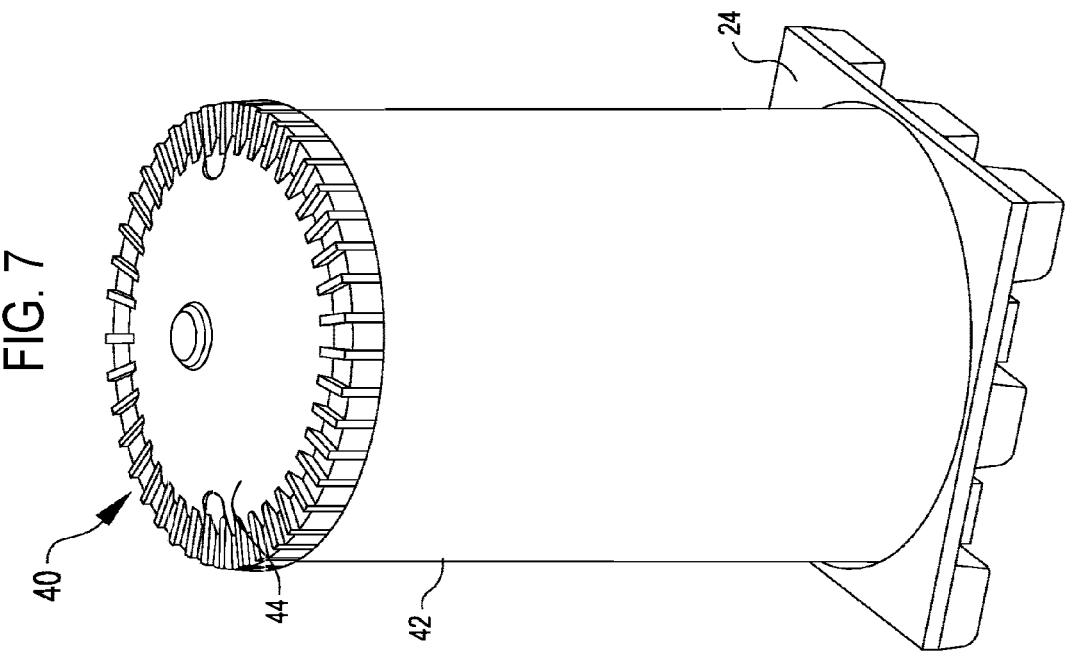
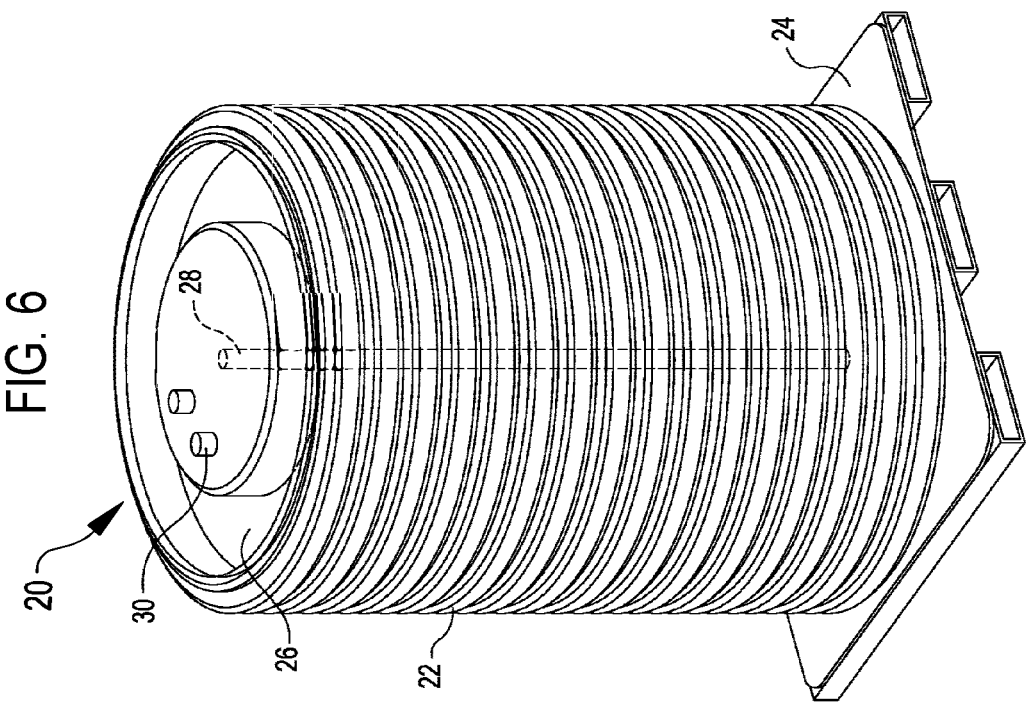

SYSTEM, APPARATUS, AND METHOD FOR OZONE-CONTAINING VACUUM STORAGE OF PERISHABLE PRODUCTS

CROSS-REFERENCES TO RELATED APPLICATIONS

This application is a continuation-in-part of U.S. nonprovisional patent application Ser. No. 17/176,063, filed on Feb. 15, 2021, titled "VACUUM STORAGE OF PERISHABLES AND CYLINDRICAL STORAGE VESSEL METHOD, SYSTEM, AND APPARATUS", which is a continuation of U.S. nonprovisional patent application Ser. No. 15/923,529, filed on Mar. 16, 2018, issued as U.S. Pat. No. 10,919,656 on Feb. 16, 2021, titled "PROCEDURES FOR OPERATING A VACUUM TO STORE PERISHABLES BY CONTROLLING PRESSURE AND OXYGEN LEVELS INDEPENDENT OF EACH OTHER AS WELL AS SETTING FLOOR AND CEILING OPERATING PARAMETERS", which claims priority to U.S. provisional Patent Application No. 62/472,284, filed on Mar. 16, 2017.

This application further claims priority to U.S. nonprovisional patent application Ser. No. 17/360,892, filed on Jun. 28, 2021, titled "MEASUREMENT AND CONTROL OF RESPIRATION OF PERISHABLE COMMODITIES IN LOW ABSOLUTE PRESSURE METHOD, SYSTEM, AND APPARATUS", which a continuation-in-part of U.S. nonprovisional patent application Ser. No. 17/176,063, filed on Feb. 15, 2021, which is a continuation of U.S. nonprovisional patent application Ser. No. 15/923,611, filed on Mar. 16, 2018, issued as U.S. Pat. No. 11,008,151 on May 18, 2021, titled "CYLINDRICAL VESSEL FOR LOW PRESSURE STORAGE OF PERISHABLE GOODS FABRICATED FROM NEAT OR REINFORCED PLASTICS," which claims priority to U.S. provisional Patent Application No. 62/472,316, filed on Mar. 16, 2017.

The entire contents of the above-referenced applications and of all priority documents referenced in the Application Data Sheet filed herewith are hereby incorporated by reference for all purposes.

FIELD

The present disclosure relates to methods, apparatuses, and systems for measuring and controlling environmental conditions within a sealed vacuum container for storing or preserving perishable products.

BACKGROUND

It has been determined by Stanley P. Burg that by placing perishable items in vacuums under low pressure between approximately 10 to 150 Torr, in combination with refrigeration, the degradation or senescence of the perishable can be significantly slowed as compared to refrigeration alone.

However, to implement low-pressure storage of perishable items on a commercially practical scale requires vacuum chambers that are not only able to withstand the forces caused by a high vacuum within the chamber but ones that can be easily and economically fabricated as well. The storage and shipment of perishable goods currently takes place primarily on rectangular pallets and within rectangular boxes or reusable plastic containers (RPC). The reasons for this are obvious; the buildings in which produce is packed and stored are rectangular, the trucks that transport the pallets use rectangular trailers, and for longer journeys, the boats and rail cars use rectangular containers. To maximize the packing efficiency along the entire distribution chain, rectangular pallets are used. While there are no universally accepted standards for the exact dimensions of pallets, they are most commonly rectangular or square in shape.

In addition, to combat pathogens, certain antimicrobials, including pesticides and fungicides, have been employed prior to harvesting. There is a wait time between the pesticide application and the harvest, and most pesticides may be broken down by time, rain, sun, or temperature. Nevertheless, a small amount of residue will remain on the surface of the perishable products. If the treating process can be done to products already harvested and stored in a movable container, it will save additional time and storage space. Thus, there is a need to eliminate antimicrobial residue during product storage and/or transit. Further, stored perishable products may be influenced by gaseous growth hormones such as ethylene. Reducing ethylene during storage will be beneficial to slow down senescence.

SUMMARY OF INVENTION

Disclosed herein relates to systems, apparatuses, and methods for measuring and controlling environmental conditions within a sealed vacuum container for preserving perishable products. In particular, disclosed herein relates to managing decay, metabolic activity, respiration, and fermentation of perishable products, reducing fungicide or pesticide residue, and reducing plant growth hormone in ozone-containing low-pressure vacuum container, including methods, apparatuses, and systems for controlling microorganisms and insects for the purposes of extending the shelf life of perishable products.

In one aspect, disclosed herein is directed to apparatus for storing perishable products in a vacuum container. Embodiments may include a vacuum container configured to contain perishable products, wherein the vacuum container has a plurality of vacuum chambers. Embodiments may include an atmosphere control system coupled to the vacuum container for measuring and maintaining the controlled atmospheric conditions within the vacuum container. In some embodiments, the atmosphere control system may include a plurality of monitors configured to measure and maintain atmospheric conditions within the vacuum container, wherein the plurality of monitors may include a pressure sensor, an oxygen sensor, and an ozone sensor. Embodiments may include a vacuum pump configured to reduce total absolute pressure in the vacuum chamber to below a total gas pressure limit, an ozone generator configured to generate gaseous ozone, and an inlet valve coupled to the ozone generator and configured to admit an ozone-containing gas into the vacuum container. In some embodiments, the apparatus may further include a microprocessor and a memory, wherein the microprocessor is configured to execute instructions stored in the memory to obtain a total absolute pressure within the vacuum container via the pressure sensor, modify and maintain the atmospheric conditions within the vacuum container in response to sample values sensed by the monitors.

In another aspect, disclosed herein relates to method for storing perishable products in a vacuum container. Embodiments may include obtaining a total absolute pressure from a pressure sensor with respect to the vacuum container, wherein the vacuum container is configured to store perishable products, and wherein the vacuum container is coupled to a vacuum pump. Embodiments may include reducing the total absolute pressure to below a total gas pressure limit, wherein the total gas pressure limit is above an anaerobic compensation point for the perishable products. In some embodiments, method may further include supplying an ozone-containing gas into the vacuum container, measuring an ethylene level within the vacuum container, measuring and controlling gas compositions within the vacuum container in response to the ethylene level, and maintaining an oxygen level within a floor and a ceiling in response to an oxygen partial pressure within the vacuum container. In some embodiments, the ethylene level may be measure by an ethylene sensor coupled to the vacuum container. In other embodiments, ethylene level may be estimated from the amount of perishable product in the chamber, its rate of ethylene production at a given temperature, and its respiration rate of oxygen consumed and carbon dioxide produced.

In yet another aspect, disclosed herein relates to apparatus and method for suppressing or killing pathogens postharvest in a vacuum container.

In yet another aspect, disclosed herein relates to apparatus and method for reducing growth hormones such as ethylene. Ozone can react with ethylene and produce carbon dioxide, water and oxygen.

In yet another aspect, disclosed herein relates to apparatus and method for reducing pesticide residues within a vacuum container. A wide range of pesticides can be oxidized by ozone. Embodiments may include a pesticide residue monitor system configured to measure residue levels in the vacuum container. In other embodiments, pesticide concentration within the vacuum container may be estimated by an estimated pesticide residue on the perishable, the amount of perishable in the chamber, the pesticide's expected rate of decay at a given temperature and ozone exposure, and the amount of ozone previously introduced into the vacuum chamber.

In yet another aspect, disclosed herein relates to apparatus and method for controlling a relative humidity within a vacuum container. Embodiments may include a humidity sensor.

In yet another aspect, disclosed herein relates to apparatus and method for disinfecting vacuum lines for postharvest storage. Embodiments may include supplying an ozone-containing gas into the vacuum container, a manifold connected to the vacuum container, and vacuum tubes, and controlling the ozone level for a pre-determined period.

The foregoing summary is illustrative only and is not intended to be in any way limiting. Features from any of the disclosed embodiments can be used in combination with one another, without limitation. In addition to the illustrative aspects, embodiments, and features described above, further aspects, embodiments, and features will become apparent by reference to the drawings and the following detailed description.

BRIEF DESCRIPTION OF THE DRAWINGS

FIG. 2A is a graphical depiction of total pressure vs. time data showing pressure variations in a vacuum storage container operated in accordance with one aspect of the methods disclosed herein.

FIG. 3 is a graphical depiction of total system pressure vs. time data showing pressure variations in a vacuum storage container operated in accordance with another aspect of the methods disclosed herein.

FIG. 6 is a perspective view of one embodiment of a cylindrical vessel for low pressure storage of perishable goods constructed in accordance with one aspect of the invention.

FIG. 7 is a perspective view of one embodiment of a cylindrical vessel for low pressure storage of perishable goods constructed in accordance with another aspect of the invention.

DETAILED DESCRIPTION

Figure 1:
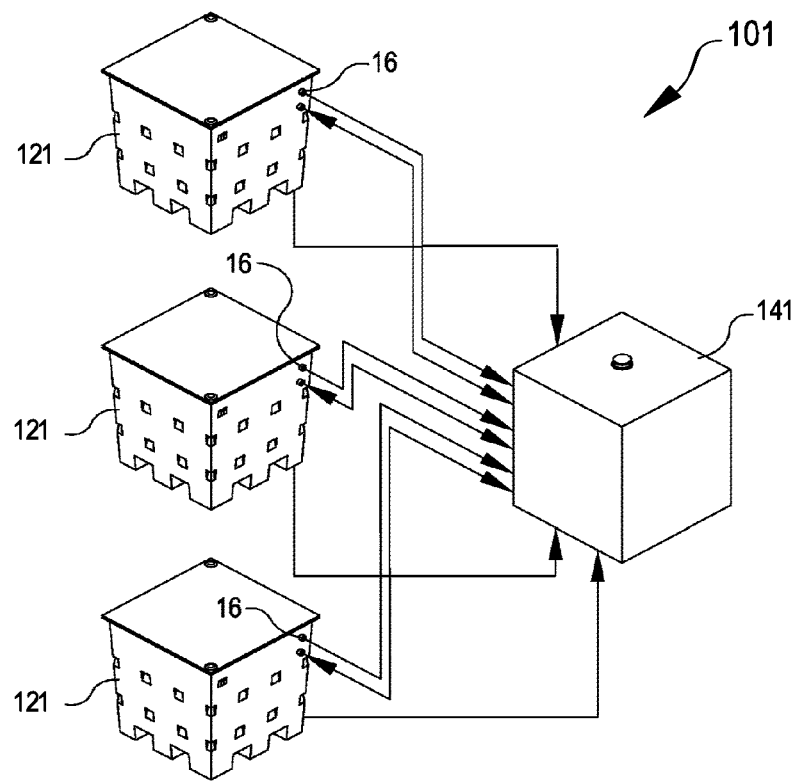
FIG. 1 is a schematic view of a system for storing and transporting perishable products under vacuum conditions using a plurality of vacuum containers under the control of a master control and pump unit.

In overview, this disclosure relates to storing and transiting perishable products in a vacuum container, including using ozone-containing gas mixture to reduce pathogens, suppress metabolic activities, reduce pesticide and fungicide residues, reduce plant gaseous growth hormone ethylene ($C_2H_4$) within the vacuum container and the storage environment, and disinfect the vacuum lines.

In the following detailed description, reference is made to the accompanying drawings, which form a part hereof. In the drawings, similar symbols typically identify similar components unless context dictates otherwise. The illustrative embodiments described in the detailed description, drawings, and claims are not meant to be limiting. Other embodiments may be utilized, and other changes may be made, without departing from the spirit or scope of the subject matter presented here. In addition to other locations, defined terms may be found at the end of this Detailed Description.

Much effort has been made to regulate the environmental conditions during postharvest storage of perishable products, factors such as oxygen ($O_2$), carbon dioxide ($CO_2$), temperature, and relative humidity of the air inside a storage chamber. This current disclosure relates to the applications of ozone-containing gas in the storage environment, which include killing or suppressing pathogens, reducing growth hormone ethylene, reducing pesticide residues, and disinfecting the storage vacuum lines.

Ozone ($O_3$) is currently being used in many industries. It is commonly used to purify air, treat drinking water, and disinfect surfaces. Gaseous ozone can be effectively used as a natural, organic, and biological substance to suppress decay and spoilage by killing or suppressing the growth of bacteria and pathogens on perishable products. As an oxidant, ozone disinfects by directly oxidizing and destroying the microorganism's cell wall, causing cellular components to leak outside the cell. This causes protoplasmic destruction of the cell, damaging constituents of the nucleic acids, and breaks the carbon-nitrogen bonds, which leads to depolymerization. During the process, ozone splits into oxygen and an ozone atom. The oxidative burst that occurs as ozone reverts to oxygen also causes an electrical discharge that will lyse the cell wall of any adjacent bacteria. In addition, the now valent oxygen atom can combine with any carbon atom to create CO, further damaging the cell wall of bacteria. Ozone kills or inactivates viruses by diffusing through the protein coat into the nucleic acid core, resulting in damage to the nucleic acids. At higher concentrations, ozone destroys the virus' exterior protein shell so that DNA or RNA structures are affected.

Some pathogenic bacteria, viruses, and fungi are susceptible to ozone, such as *Escherichia coli, Listeria* species (e.g., *Listeria monocytogenes*), *Salmonella* species (e.g., *Salmonella choleraesuis, Salmonella enteritidisl*), tobacco mosaic virus (TMV), *Penicillium* species (e.g., *Penicillium digitatum*, a citrus pathogen), and *Fusarium oxysporum*. The aforementioned species are not meant to be limiting. This list is not a comprehensive list.

In addition to the disinfection effect on microorganisms, ozone can be used to abate growth hormone ethylene ($C_2H_4$) generated from the ripening process. During storage, the gaseous growth hormone ethylene, which is responsible for regulating growth, ripening, and senescence, is released from the perishable products and continues to increase. In the case of climacteric fruits, when the postharvest perishable reaches the climacteric stage, the production of ethylene rapidly increases. Ethylene production decreases perishable shelf-life and increases its susceptibility to pathogen attacks.

Some fruits, such as kiwifruit, an editable berry of several species of woody vines in the genus *Actinidia*, are highly susceptible to contamination from the growth hormone ethylene during storage. Currently, the best practice for perishables like kiwifruit is to store them in a facility separated from all ethylene-producing fruits or vegetables. This leads to increased supply chain complexity and storage costs for kiwifruit.

It has been found that gaseous ozone can react with ethylene rapidly, and it has the potential as an efficient and readily adaptable technique for abating ethylene. When introduced, $O_3$ and $C_2H_4$ react rapidly, initially producing the intermediate compound ethylene oxide, then further breaking the carbon-carbon bond to produce carbon dioxide and water as $$H_2C{=}CH_2+6O_3 \rightarrow 2CO_2+2H_2O+6O_2 \quad (1)$$

By adding ozone to the storage container, the ethylene within the storage container can be reduced to carbon dioxide, water, and oxygen. Reducing the ethylene within the storage chamber can also reduce the ethylene evacuated from the storage chamber, and therefore, the air expelled to the local room environment contains no or less ethylene. This will significantly reduce the cost of storing the ethylene producers, such as apples, avocados, peaches, and pears, which would influence the ripening of other perishables stored in proximity.

The $O_3$ and $C_2H_4$ reaction is under a controlled environment. The levels of ozone and ethylene are constantly monitored or estimated through calculations and controlled. According to some embodiments, an ozone generator may be incorporated, which can use free ambient air (20.94% $O_2$ by volume) as the feed gas. According to some embodiments, one or more ethylene detectors and one or more ozone detectors may be employed. Ethylene detector could be a commercial sensor for detecting ethylene, such as an ethylene sensor employing arrays of carbon nanotubes that are able to detect changes in electron flow in the presence of ethylene. The ethylene detector may then send the detection signal to a control unit, which may modify the environmental conditions within the vacuum container. In some cases, the oxidation of ethylene can result in unwanted byproducts such as formaldehyde. As the system is under vacuum with frequent servicing, volatile molecules such as ethylene and formaldehyde are removed quickly from the chamber during pump down stages.

Ozone can also be used for the degradation of pesticide residues. A broad range of pesticides can be degraded by ozone, such as ethyl formate, pyrimethanil, cyprodinil, and fludioxonil. It is found that the degradation rate of pyrimethanil can still achieve 51.6% even under a low concentration of gaseous ozone (0.3 L/L), Karaca et al., Effect of continuous 0.3 L/L gaseous ozone exposure on fungicide residues on table grape berries, Postharvest Biology and Technology, 64, 154-159, 2012.

In some embodiments, the ozone level may be maintained between 0.05 µL/L to 200 mL/L (about 50 ppb to $2\times10^5$ ppm) to be effective. The supply of the ozone-containing gas may be placed once or multiple times during the storage, depending on the stored perishable products. The ozone level may be maintained for as short as 30 minutes or for a longer period, e.g., seven days.

Control of Floor and Ceiling Conditions in Reduced Pressure Environment

FIG. 1 depicts a schematic view of system 101 for maintaining perishables in a reduced pressure, controlled atmosphere environment for purposes of maintaining freshness and avoiding spoilage. Such a system is described in application Ser. No. 15/294,554, entitled "SYSTEM AND METHOD FOR TRANSPORTING AND STORING POST-HARVEST FRUITS, VEGETABLES AND OTHER PERISHABLE COMMODITIES UNDER CONTROLLED ATMOSPHERIC CONDITIONS," filed Oct. 14, 2016, the specification of which is incorporated by reference herein.

As shown in FIG. 1, system 101 includes one or more chambers 121 capable of withstanding a high vacuum within and arranged to contain the perishable item(s). Each of the containers is coupled to a control unit 141 that includes a number of devices, such as vacuum pumps, temperature sensors, pressure sensors, oxygen sensors, ozone sensors, ethylene sensors, and humidity sensors, for monitoring such parameters within the containers as pressure, humidity, gas concentrations, etc. These devices communicate with the chambers via one or more apertures 161 in the containers.

In accordance with one aspect of the invention, a control system is included in the control unit 141 for controlling atmospheric parameters according to protocols that, in accordance with another aspect of the invention, optimize energy efficiency, reduced senescence, and allocation of available resources.

The control system disclosed herein manages environmental conditions inside the vacuum storage chambers to maintain optimal conditions for preserving perishable products. The control system comprises one or a plurality of microprocessor controllers or programmable logic controllers, vacuum pumps and intake valves with and without air enrichment membranes connected to the chambers either independently, or as a multi-chamber control system network to facilitate management of the environmental conditions inside the storage chambers. The control system includes the following:

1. Microprocessor controllers or programmable logic controller (may include multiple processors for additional independent process control needs)—microprocessor controllers or programmable logic controller can control one or a plurality of chambers.
2. Vacuum pump—can control one or a plurality of chambers.
3. Sensors consisting of a) oxygen; b) temperature; c) pressure, d) ozone, e) ethylene, all for use with one or a plurality of chambers.
4. Valves—can control one or a plurality of chambers.
5. Oxygen enrichment module comprising a membrane at the air inlet which raises oxygen levels above relative atmospheric concentration levels, or the system can be connected to oxygen storage containers. A separate embodiment of the control system facilitates a more cost-effective approach leveraging a manifold in which a set of common valves may communicate with the pump, oxygen membrane, vent, and sensors. These, via logic in the control system would be opened along with a specific chamber valves when a specific event is required, e.g. pumping oxygen on that specific chamber.
6. Ozone control module comprising a switching valve which admits a pre-determined amount of ozone to the system 100. The switching valve can be connected to an ozone generator or an ozone storage container. The control system controls specific chamber valves when a specific event is required, e.g., pumping ozone on that specific chamber.
7. Control system which can be controlled via a connected network (Ethernet, Wi-Fi, cellular, Nodal etc.) or a programmable logic controller supported by an algorithm which does away with the requirement to be networked. During normal operation, as events transpire, the control system will need to service multiple chambers. Chambers will be prioritized with their respective needs and serviced accordingly in order of priority, and separately from each other.
8. Manifold of solenoids communicating with each other, including oxygenation, ozone generator, vacuum pump, and vent along with a solenoid for each vacuum controlled by a common control system.
9. Accumulator tank and valve—a separate embodiment could include the use of an accumulator tank to facilitate "rapid" pump-down of the system or otherwise as a vacuum storage vessel to assist in servicing chambers as they need to be pumped down while improving use-efficiency of the pump in a multi chamber or even single chamber system. Vacuum would be "stored" in the accumulator to be used to help pump down chambers at a future point in time.

| Parameters monitored | Parameters that are controlled |
|---|---|
| Oxygen partial pressure | Pressure |
| Cabon dioxide Concentration | Carbon dioxide |
| Ozone concentration | Oxygen |
| Ethylene concentration | Ozone |
| Humidity | |
| Total system pressure | |
| Chamber outside temperature | |
| Chamber commodity temperature | |

The programmable logic controller connects to the sensors, valves, and pump(s) to complete a control network to manage the independent vacuums. System pressure and, oxygen levels are maintained within a floor and ceiling independent of each other. Temperature, and humidity are monitored. To this end, the pump and/or intake only operate when the pressure and/or oxygen levels fall outside the floor and/or ceiling. Under certain conditions, if the management system does not account for temperature, normal reduction in pressure during a pump-down cycle in the system may be sluggish or not proceed at all do to water vapor-pressure constraints which would allow any liquid water to enter a gas phase-change drastically reducing pumping efficiency. Under these conditions the system will compensate and adjust the floor of the operational range of the chamber pressure control parameters to prevent continuous pump operation. Capturing historical operating data for specific perishables allows for the opportunity to build predictive algorithms as to how the vacuums should operate, potentially doing away with the networked system and/or sensor feedback system.

The vacuum pump facilitates the pump down of the vacuum system to maintain the pressure of the chamber(s) within their floor and ceiling pressure set points. With the management system monitoring and maintaining oxygen and carbon dioxide in the chambers within their own floor and ceiling set points, the vacuum pump does not need to run continuously for a particular chamber(s).

The sensors utilized provide feedback directly to the programmable logic controller indicating operational conditions inside the chamber(s). Separate valves in the system allow for the in-flow of normal air or oxygen enriched air via the membrane, allowing air to be pumped out of the vacuum, and finally for the system to re-pressurize to atmospheric levels for loading/unloading etc. of the vacuum chamber(s).

An alternative embodiment utilizes the independent control of pressure and oxygen combined with pumping the hypobaric vessel to a low-pressure floor and slowly leaking normal air or oxygen enriched air into the vessel at a very low rate allowing the perishable to consume oxygen. The rate at which the oxygen is added to the system controls the respiration rate of the commodity stored within and is limited to an amount, just enough to keep the commodity from suffering anaerobic damage. At a given pressure ceiling the chamber is pumped back to its lower pressure threshold and the controlled oxygen leak-up cycle is repeated. This limits pumping time while sustaining a low pressure that assists in the diffusion of respiratory gasses and volatiles. This process also limits commodity water loss by retaining the water vapor within the chamber.

In accordance with another aspect of the invention, a process for "flushing" the vacuums is provided. As the perishable items undergo senescence they produce gases and volatiles. These gases and volatiles build up inside the chamber and may cause harm to the perishables. The vacuum pump can be set to operate at a certain interval regardless of whether or not pressure is within the set floor and ceiling, so as to evacuate the chamber of these harmful gases and volatiles.

In accordance with still another aspect of the invention, the pressure is allowed to rise above what is historically considered low pressure for example up to 300 Torr. The purpose for this is to relieve the chamber of material "creep" to the structure which can result in catastrophic failure of the vacuum container. Even though the pressure is allowed to rise oxygen can be controlled independently so as to keep between the targeted floor and ceiling.

In accordance with still another aspect of the invention, a manifold with multiple solenoids is provided which includes three common solenoids (pump, $O_2$ membrane, vent), along with a solenoid for each individual chamber in a system of multiple chambers to be communicating with a common control system.

Temperature is monitored outside the chamber as well as inside the chamber. Temperature measurements are utilized for alert-based indications.

Operating Protocols:
1. System Pressure—The pump will activate to bring down the pressure to its lower bound of the two pressure-control set-points. Any other operations for maintaining oxygen level are bypassed if pressure reaches the upper bound trigger point. This means, that the oxygen membrane will not be allowed to flow oxygen-enriched air into the chamber if the pump is running (or, if in a multi-chamber, single pump system, a pump down valve may be opened or closed to control pump down) for any reason. Once the low threshold is met of the total system pressure, oxygen membrane control resumes. In addition, the pump could be set to run at certain intervals so as to evacuate gaseous mixtures from the chamber regardless of whether or not system pressure is within the set floor and ceiling.
2. Oxygen control—The air intake valve allowing the in-flow of normal air or oxygen enriched air via the membrane is triggered on/off by upper and lower bound limits of oxygen partial pressure. The oxygen concentration is measured continuously and if oxygen levels are low enough to allow the oxygen membrane to remain triggered all the way through the upper limit of total system pressure, the vacuum pump will be turned back on to bring total system pressure to its lower limit. Oxygen membrane will be closed during the pump-down process.
3. Sensor reduction for multi-chamber control—Rather than measuring oxygen at each chamber with a separate sensor, the system may incorporate one oxygen sensor at the manifold block and periodically pump a designated chamber down for several seconds allowing accurate oxygen readings for each chamber while still using a single oxygen sensor.
4. Chamber re-pressurization valve—manually controlled to repressurize vacuums.

The above-described operating protocols can be understood with reference to FIGS. 2-3.

Figure 2B:
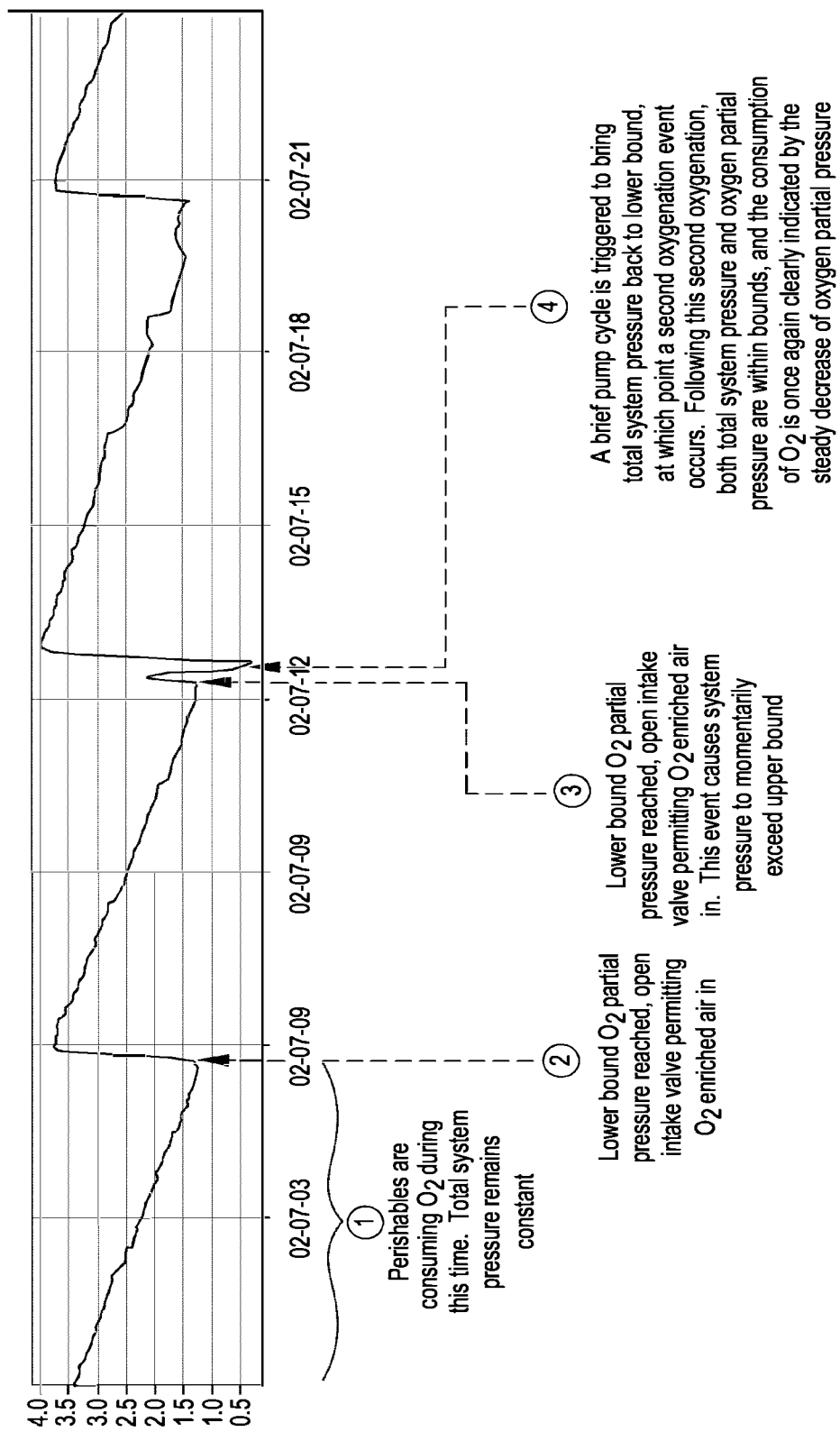
FIG. 2B is a graphical depiction of oxygen partial pressure vs. time data showing oxygen pressure variations in a vacuum storage container operated in accordance with another aspect of the methods disclosed herein.

As illustrated in FIG. 2A, the total pressure within the chamber has initially been reduced to approximately 24 Torr. As illustrated in FIG. 2B, the initial oxygen partial pressure is approximately 3.5 Torr. No further action is taken, and the perishable item contained within the chamber respires at these atmospheric conditions. As respiration continues, the oxygen partial pressure drops as the perishable item consumes oxygen.

When the oxygen partial pressure drops to a predetermined limit, such as approximately 1.25 Torr as illustrated in FIG. 2B, the intake valve to the chamber is opened, thereby permitting oxygen enriched air into the chamber. This has the effect of causing the total pressure within the chamber to rise to a predetermined upper limit, such as approximately 32.5 Torr, at which point the intake valve to the chamber is closed. As illustrated in FIG. 2B, this has the effect of increasing the oxygen partial pressure to approximately 3.75 Torr. Again, no further action is taken, and the perishable item contained within the chamber respires at these atmospheric conditions. Again, as respiration continues, the oxygen partial pressure drops as the perishable item consumes oxygen. This cycle repeats as the perishable item is stored, as further illustrated in FIGS. 2A and 2B.

As further illustrated in FIG. 2A, when the intake valve to the chamber is opened to admit oxygen enriched air, the total pressure in the chamber can, and likely will, momentarily exceed the upper pressure limit or bound set for storage of the perishable item. A brief pump cycle is then triggered to bring the total system pressure back to the lower bound, at which point a second oxygenation event occurs. Following this second event, both total system pressure and oxygen partial pressure are within the predetermined bounds, and the consumption of oxygen is again indicated by the steady decrease of oxygen partial pressure.

Another method of regulating oxygen partial pressure within the chamber is shown in FIG. 3. As illustrated, after the initial evacuation of the vacuum chamber, wherein the oxygen partial pressure is reduced to approximately 3.5 Torr, the intake valve to the chamber is opened at predetermined intervals, that may or may not be of equal length, to admit either atmospheric or oxygen enriched air into the chamber. The total system pressure thus increases in regular steps until it rises to a predetermined upper pressure bound, at which time the vacuum pump is operated to reduce pressure within the chamber to the desired atmospheric conditions.

Although particular pressures, times, etc., have been disclosed for illustrative purposes, it will be appreciated that these specific parameters do not limit the invention in its broader aspects.

Vacuum Storage Structures

Figure 4:
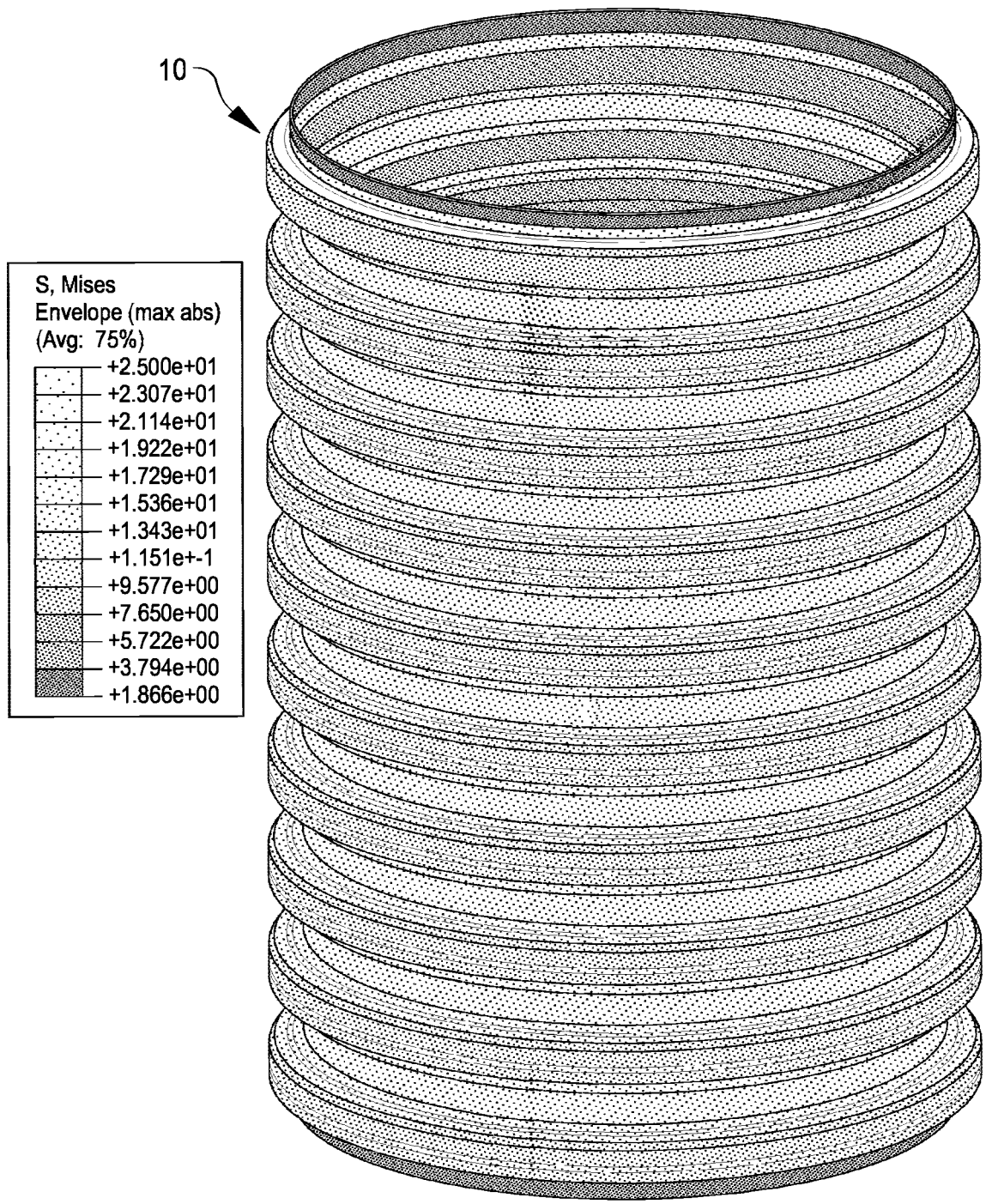
FIG. 4 is a contour plot showing stress distribution in a cylindrical structure from equivalent pressure loading analyzed using Finite Element Analysis (FEA).
Figure 5:
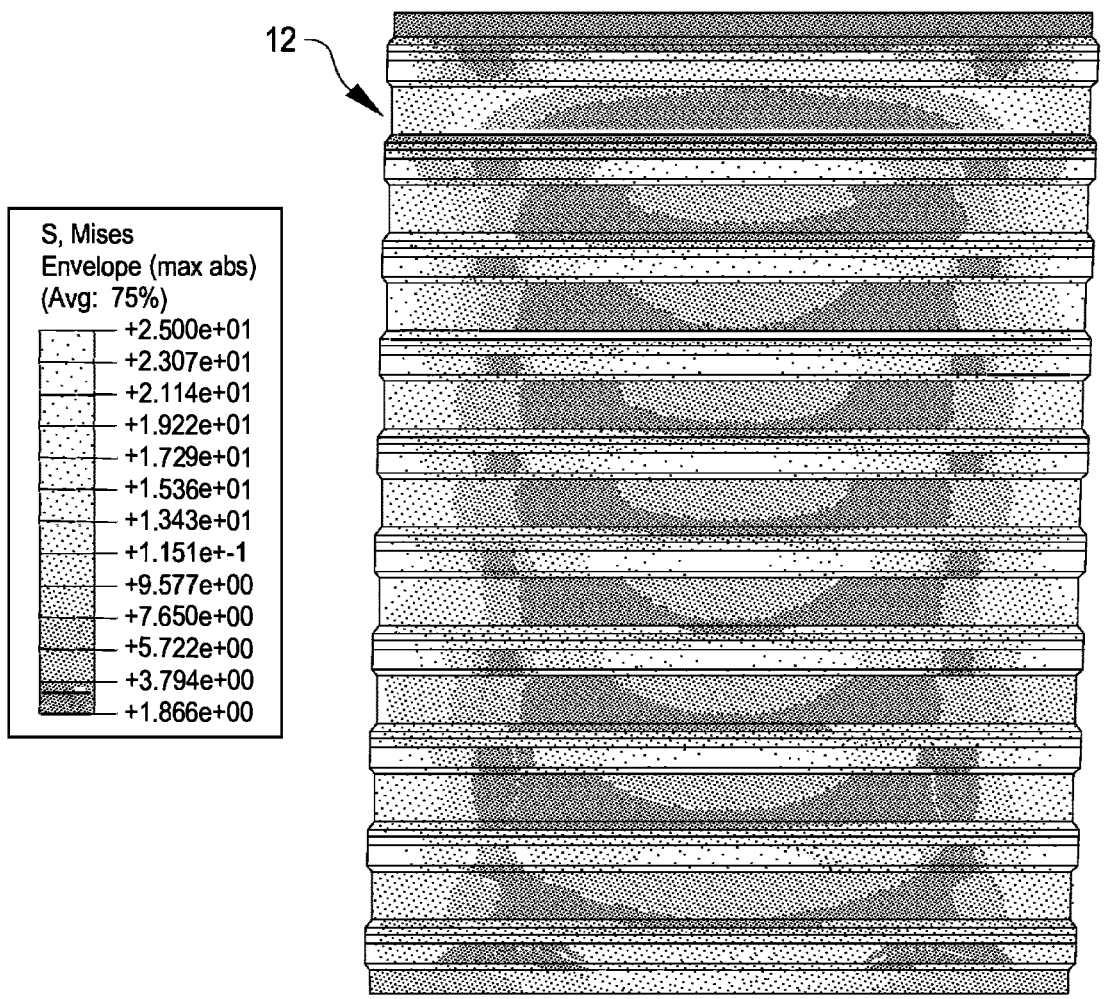
FIG. 5 is a contour plot, similar to FIG. 4, showing stress distribution in the rectangular wall of a cubic container subject to the same pressure loads as in FIG. 4.

Cubic shaped pallets and containers are most efficient for transporting goods when accounting for packing efficiency and logistics standards. However, cubic shaped structures are significantly less efficient reacting loads due to the application of high or low pressure. Pressurized gas cylinders are an example of a high-pressure vessel, where walls are loaded primarily in tension due to outward pressure of the contained gas. A submarine underwater is an example of a low-pressure vessel, where the walls are loaded in compression due to the hydrostatic forces acting on all surfaces. Structural efficiency can be quantified by the amount of material used in the structure, the weight of the resulting structure, complexity of the design, and the subsequent cost. Cubic shaped pressure vessels are very rare and are used only when packaging requirements necessitate a specific shape, or loads (pressures) are low, or the size is small. FIGS. 4 and 5 shows examples of a cylindrical and square-shaped pressure vessel subject to a 1 atmosphere pressure load.

FIG. 4 is a contour plot showing stress distribution in a cylindrical structure 10 from equivalent pressure loading analyzed using Finite Element Analysis (FEA). As shown, stress levels throughout the structure range consistently and evenly between 5-9 MPa.

FIG. 5 is also a contour plot, similar to FIG. 4, this time showing stress distribution in the rectangular wall of a cubic container 12 subject to the same pressure load of 1 atmosphere. As illustrated, the stresses vary dramatically throughout the structure due in large part to the resultant bending stresses. At the corners and at mid span, stress levels exceed the yield strength of the material, which in this case is ~25 MPa. In other areas, stresses are negligible. This is an example of an inefficient structure, and significant internal reinforcement is necessary to make the box capable of withstanding the loads resulting in increased weight and cost.

Materials

Atmospheric pressure is about 14.7 psi at sea level, multiple orders of magnitude lower than the typical operating pressure of a high pressure tank (3,000 psi). While most high pressure tanks are manufactured from exotic composites or high strength metallic materials, the relatively low pressures of a vacuum chamber allow for cheaper materials to be employed including commodity grade thermoplastics. Candidate polymers include PP, HDPE, and PVC. While thermoplastic polymers like PP, HDPE, and PVC provide exceptional manufacturing rates, toughness, and low cost, they have low strength and are prone to suffer from creep during extended periods of applied force, even if this force results in stress well below the typical yield point. The reduced modulus and strength due to creep can lead to permanent deformation of the chamber, which can lead to loss of seal or structural stability. To further enhance the strength and stiffness of these materials, and to reduce the effects of creep, fillers including discontinuous glass or carbon fibers can be added to the polymers during the compounding process yielding a cheap composite material capable of high rate manufacturing.

Metallic materials such as aluminum and steel do not suffer from creep, and can be valid candidate materials for vacuum vessels as well. However, other issues including weight, difficulty maintaining seal following the manufacturing process, and cost do make them less attractive candidates.

Thermosetting polymers including, but limited to, epoxy, vinyl ester, and polyester are also immune to the effects of creep. When reinforced with high strength, continuous fibers such as glass or carbon, these composite materials are extremely strong and stiff, and can result in reduced wall thickness and weight of the structure. However, thermosetting polymers inherently take more time to cure, which reduces the manufacturing rate of the vessels while increasing cost. They also have lower toughness than thermoplastic polymers, which can be a problem when considering the abuse due to common shipping conditions.

Architecture

Low pressure (vacuum) vessel architecture differs dramatically from high pressure vessel design. Due to primarily compressive stress, the chamber architecture must provide adequate stiffness to prevent buckling of the walls or collapsing due to a geometric instability. In a single wall chamber, the wall thickness must be adequate to provide necessary stiffness and strength. For unreinforced thermoplastic materials, a single wall vessel of 36" diameter would need 0.4-0.5" wall thickness, although wall thickness can, depending upon application pressure, range between 0.10 and 1.00 inches.

To further enhance stiffness and increase buckling loads, additional layers of material can be added to the vessel. These additional walls can be shaped or corrugated to intermittently contact the inner liner and reduce the lengths of unsupported material span. The chamber can be extruded in a method similar to the now common large diameter plastic drainage pipes, and have 1-3 thinner layers of walls. When multiple plies, or layers of material are used, the total wall thickness can be thinner than a single ply architecture. This results in reduced cost, weight, and improved damage tolerance over single wall chamber designs. These benefits are again realized because of the additional stiffening characteristics of a shaped wall, which increases resistance of the structure to buckling.

Stronger and stiffer metallic and higher performance composite materials may be capable of withstanding the loads using much thinner walls. However, a single wall provides little resistance to abuse loads and can be more prone to leaking. In general, metallic and thermosetting composite materials take more time to fabricate than commodity grade thermoplastics.

The diameter of the chamber can be 30 to 48 inches, designed to fit on most common pallets. Heights of the chamber can range from 12 to 80 inches, common to most pallet shipments or perishables storage. It will be appreciated, however, that depending upon the application and goals, the chambers can be of other sizes as well.

Internal & External Support Structure

To manage large axial loads induced from the lid and base of the pipe or chamber, a central column may be placed along the central axis of the chamber spanning the two end structures. This support column will reduce axial loading in the walls of the chamber, which can lead to buckling and damage of the chamber. A small diameter but thick-walled internal structure such as an aluminum column can manage the applied axial loads more efficiently than the thin walls of the chamber. Depending on the strength and stiffness of the chamber and end structures, a plurality of internal support columns can be used. The distribution of these columns can be optimized depending on the design of the end structures and chambers. If necessary, up to 5 columns may be used to manage the axial loads and reduce stress in the chamber walls.

In addition, longitudinal stringers of a higher strength and stiffness can be integrally molded into the walls of the plastic chamber. Conversely, so as not to affect useful storage area of the chamber, the support structure can be placed outside the vessel but near the vessel walls to improve load-bearing performance.

Pallet Base and Lid

The pallet base may look similar to existing pallets on the market today, with 4-way forklift entrance and sturdy legs. However, the loads to the vacuum far exceed the weight of any amount of supported fruit, so the pallet must be extremely strong and stiff. For example, the forces acting on the pallet base and lid exceed 14,000 pounds under full vacuum. The pallet architecture is based around known twin-sheet thermoforming technology, using integrally formed steel or aluminum stringers to react the out-of-plane vacuum forces.

HDPE is an attractive material for these vacuum pallet bases for a number of reasons. First, HDPE is exceptionally tough and resistant to damage. It also has extremely low permeability, meaning lower vacuum leak rates of the chamber. It is also very cheap, and easily formed using a number of processes.

To improve the performance of HDPE, fillers such as glass or carbon fibers can be added to the base resin. The resultant structure will be stronger and stiffer when compared to the same manufactured from unreinforced HDPE.

Other candidate materials include PP, PVC, and thermosetting polymers with various levels from reinforcement from 5%-60% by weight.

A separate lid may be conic or convex in shape to maintain stability and strength, without the need for metallic stringers. Or, the base pallet can be used as a lid, to minimize necessary part numbers and/or tooling costs.

Example Assemblies

FIG. 6 depicts one embodiment of a cylindrical vessel 20 for low pressure storage of perishable goods constructed in accordance with one aspect of the invention.

As shown in FIG. 6, the cylindrical vessel includes a section of cylindrical large diameter corrugated plastic drainage pipe 22 having 1, 2 or 3 thinner layers of walls. The pipe is formed of a polymer, such as PP, HDPE, or PVC. Each layer of material ranges from 0.05" to 0.25". Where the material joint together, the total wall thickness may exceed ¼." The diameter of the pipe is preferably between 30 and 48 inches so as to fit on most common pallets. Preferably, the height of the chamber ranges from 12 to 80 inches, common to most pallet shipments or perishables storage.

As further illustrated in FIG. 6, the pipe rests on a generally square or rectangular pallet 24 that is preferably formed of Carbon reinforced HDPE. In the illustrated embodiment, the pallet is generally square and configured to be transported by standard fork trucks. The upper end of the pipe is fitted with a generally circular flat top or lid 26 that, after placement over the top end of the pipe 22, is sealed so as to permit the formation of a vacuum within the vessel. A seal is also provided between the lower end of the pipe and the upper surface of the pallet to help maintain the vacuum.

As further illustrated in FIG. 6, the vessel includes an interior support 28 that, in the illustrated embodiment, consists of a rigid cylindrical rod extending upwardly along the central axis of the pipe from the top of the pallet to the underside of the top or lid. The support can be formed of other suitable, rigid materials such as metal or higher performance composites. Various ports 30 are preferably provided in the top or lid to permit the attachment of such apparatus as vacuum pumps, sensors, gas inlets and other devices for monitoring and controlling the atmosphere within the vessel.

FIG. 7 depicts another embodiment of a cylindrical vessel 40 wherein the pipe section 42 is of a single layer configuration and wherein the top or lid 44 is of a convex shape. Again, the top or lid and the upper section of the pipe are detachably sealed to each other to maintain a vacuum within the vessel, as are the lower portion of the pipe and the pallet on which the pipe rests. The convex shape of the top or lid helps withstand the external pressures resulting from the formation of a vacuum within the vessel that allows the central support to be dispensed with. Alternatively, the central support can be included to further withstand the pressures that result. Furthermore, the lid can be concave in shape resulting in a state of tensile stress as opposed to compressive.

Figure 8:
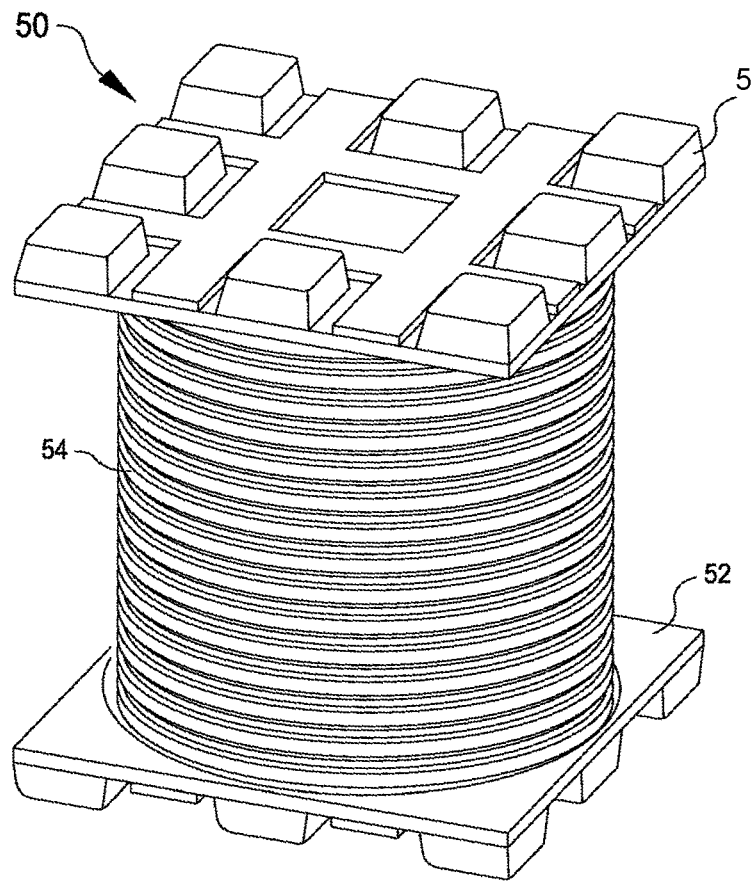
FIG. 8 is a perspective view of one embodiment of a cylindrical vessel for low pressure storage of perishable goods constructed in accordance with another aspect of the invention.

FIG. 8 depicts another embodiment of a cylindrical vessel 50 wherein a single pallet design 52 is used to seal both the upper and lower ends of the pipe 54. In this embodiment, the pipe is of a double or triple layer plastic design, and each of the upper and lower pallets are substantially the same. This has the advantage that sealing of the pipe can be accomplished with a single pallet design, resulting in reduced manufacturing costs and ease of use, in that a single inventory of pallets can be provided for sealing both ends of the pipe. Again, the top or lid and the upper section of the pipe are detachably sealed to each other to maintain a vacuum within the vessel, as are the lower portion of the pipe and the pallet on which the pipe rests. These thermoformed plastic pallets may include metallic stringers for additional strength.

Figure 9:
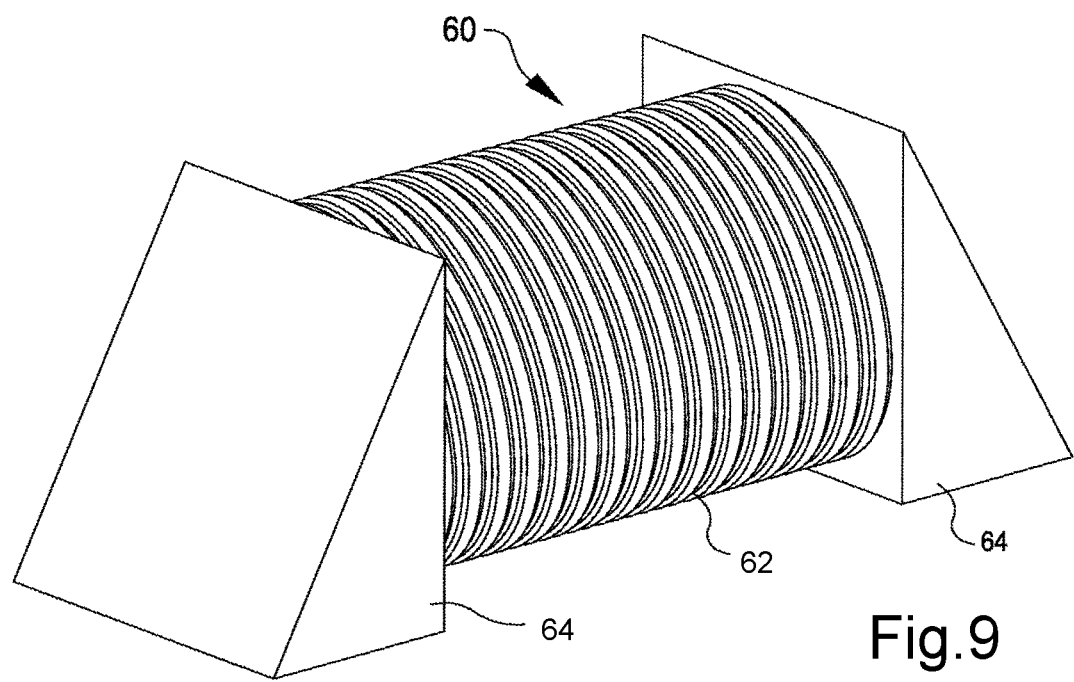
FIG. 9 is a perspective view of one embodiment of a cylindrical vessel for low pressure storage of perishable goods constructed in accordance with another aspect of the invention.

FIG. 9 depicts another embodiment of a cylindrical vessel 60 constructed in accordance with one aspect of the invention. In this embodiment, the chamber axis defined by the pipe 62 is aligned horizontally with the ground, with the end caps 64 supported using external framing. This allows for a longer vessel, statically affixed to the floor. Critical axial loads are managed by the framing supporting the end caps, as opposed to the walls of the vessel. The design and architecture of the end supports are not covered in detail at this time but eliminate the need for central support columns within the chamber.

Figure 10:
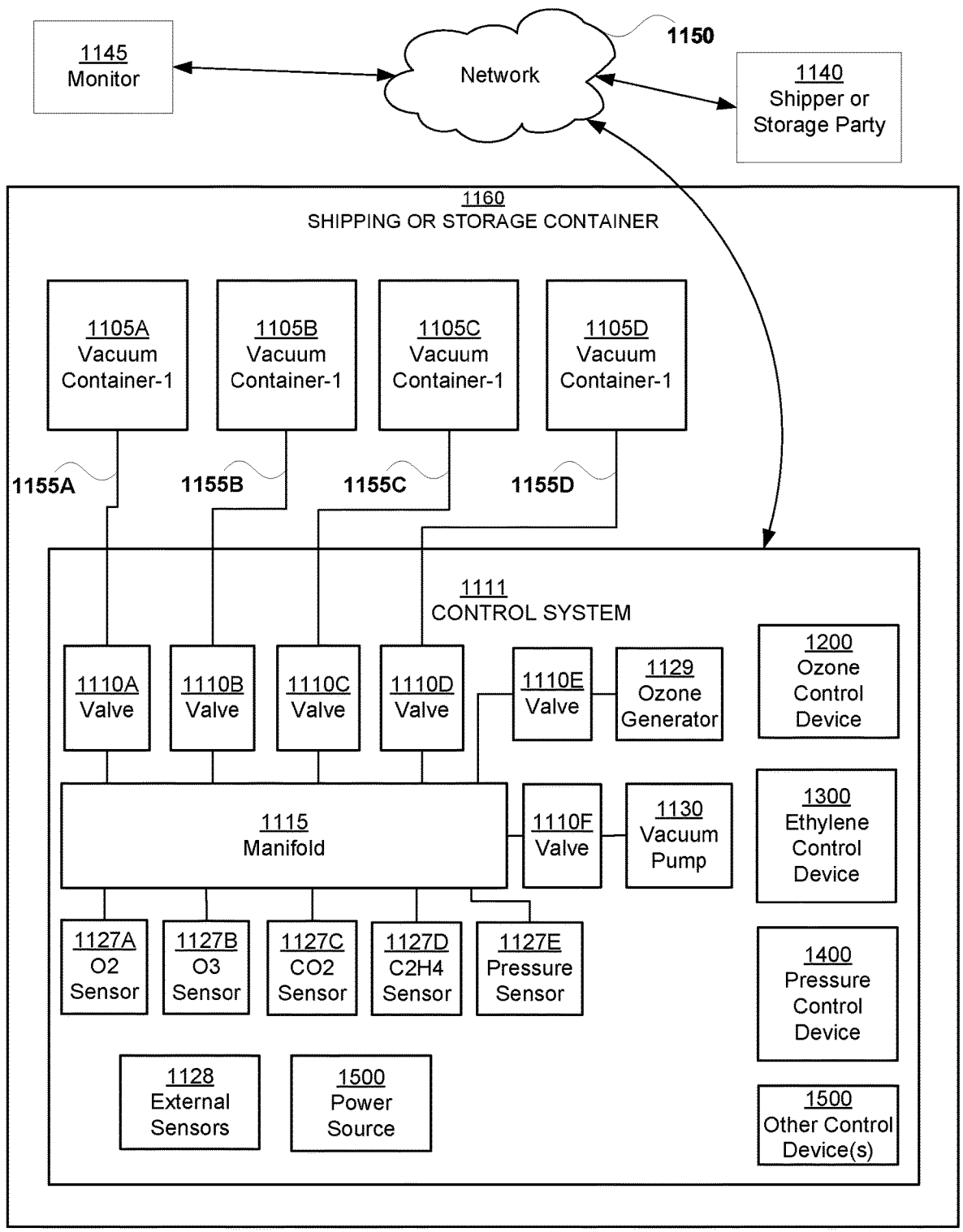
FIG. 10 is a network and device diagram illustrating an example of a shipping or storage container containing vacuum containers and control system, according to some embodiments.

FIG. 10 is a network and device diagram illustrating an example of a shipping or storage container 1160 containing vacuum containers 1105 and control system 1111, according to some embodiments. Shipping or storage container 1160 is not necessary but illustrates an example of an environment in which one or more vacuum containers 1105 (e.g., 1105A-1105D) and control system 1111 may be found and which may be used to store and or transport a perishable commodity. Other environments may be suited to ship or storing perishable commodities. A greater or lesser number of vacuum containers 1105 may be used. Conditions, such as the temperature of shipping or storage container 1160, may be controlled by a third party.

Vacuum containers 1105 may include chambers capable of withstanding atmospheric air pressure when the interior space, within the vacuum container 1105, is depressurized to an internal absolute pressure on the order of 5 and 380 Torr (herein, "low absolute pressure") and arranged to contain perishables. Vacuum containers 1105 may be, for example, rectangular or tubular bodies with end caps. End caps may be removable to allow the arrangement of perishables within vacuum container 1105. A seal may be present between the bodies and the end caps. Structures may be present in the bodies and or end caps to strengthen vacuum container 1105 against ambient air pressure when absolute pressure within vacuum container 1105 is in the low absolute pressure range. Such structures may comprise bulkheads, stringers, and or braces, including an internal brace, and or an internal rod from one end to another end.

Vacuum containers 1105 (e.g., 1105A-1105D) are connected to control system 1111 by one or more vacuum tubes 1155 (e.g., 1155A-1155D). Vacuum tubes 1155 may each comprise two (or more) sub-vacuum tubes; where multiple sub-vacuum tubes lead to a single vacuum container 1105, a first sub-vacuum tube may be used to withdraw gas from vacuum container 1105, while a second sub-vacuum tube may be used to introduce gas into vacuum container 1105. A single vacuum tube may be used to both withdraw and introduce gas into vacuum container 1105. Vacuum tubes 1155 are fabricated to resist collapse under standard air pressure, notwithstanding low internal air pressure. Vacuum tubes 1155 may connect to valves 1110.

One or more vacuum containers 1105 may be depressurized by a vacuum pump 1130, whether or not through control system 1111, sealed, and then later connected to control system 1111 by one or more vacuum tubes 1155.

Valves 1110 may be operated manually or electronically, such as by activation of a solenoid or the like. Valves 1110 may be opened and closed by ozone control device 1200, ethylene control device 1300, pressure control device 1400, and other control device(s) 1500. Electrical wiring, not illustrated in FIG. 10, may connect valves 1110 to the components of the control system 1111.

Ozone control device 1200 may directly or indirectly control the ozone sensor 1127B, ozone generator 1129, and one or more valves 1110 (e.g., 1110E) to monitor and control the ozone levels in the vacuum containers 1105 as well as the manifold 1115. Ozone control device 1200 may comprise computer-implemented instructions that perform protocols in response to the ozone level and other gas compositions in the vacuum containers 1105 and the manifold 1115. Ozone control device 1200 may connect to external sensors 1128 that monitor the ambient air outside the vacuum containers 1105.

Ethylene control device 1300 may be configured to monitor the ethylene levels in the vacuum containers 1105 as well as the manifold 1115. Ethylene control device 1300 may directly or indirectly control the ethylene sensor 1127D and one or more valves 1110.

Pressure control device 1400 may be configured to control the total pressure and the partial pressures of oxygen, ozone, and carbon dioxide within vacuum containers 1105. Ethylene control device 1300 may directly or indirectly control the pressure sensor 1127E, vacuum pump 1130, and one or more valves 1110 (e.g., 1110F).

Other control device(s) 1500 may include devices that monitor and control other factors of the environmental conditions, such as oxygen level, carbon dioxide level, temperature, and humidity. In addition, other control device(s) 1500 may comprise sensors that can detect the amount of pesticide residues. Other control device(s) 1500 work closely with other components of the control system, such as ozone control device 1200, ethylene control device 1300, and pressure control device 1400.

The ozone control device 1200, ethylene control device 1300, pressure control device 1400, and other control device (s) 1500 may be independent devices that each connects to control system 1111, or an integrated device that having inter-connected modules that perform the functionalities of devices 1200-1500.

For example, all valves 1110 may be closed, except valve 1110D may be opened to connect vacuum tube 1155D to manifold 1115 and valve 1110H may be opened to connect manifold 1115 to vacuum pump 1130. Gas may be then withdrawn from vacuum container-4 1105D by vacuum pump 1130, via manifold 1115.

For example, all valves 1110 may be closed, except valve 1110H, connecting manifold 1115 to vacuum pump 1130. Vacuum pump 1130 may draw the pressure within manifold 1115 below a pressure in vacuum container-2 1105B. Valve 1110H may then be closed. Valve 1110B may then be opened, exposing vacuum container-2 1105B to the lower pressure in manifold 1115 and allowing gas in vacuum container-2 1105B to flow into manifold 1115. Other configurations and methods of using manifold 1115 are discussed herein.

One or more sensors 1127 may be directed toward and/or integrated into manifold 1115, into one or more vacuum containers 1105, or into one or more vacuum tubes 1155. Sensors 1127 may connect to the manifold via valves (not illustrated in FIG. 10). Sensor 1127 may comprise, for example, one or more gas sensors, such as one or more of oxygen sensor 127A, ozone sensor 1127B, carbon dioxide sensor 1127C, ethylene sensor 1127D, a moisture or humidity sensor, an ion sensor, a gas chromatograph, a mass-spectrometer, a pH sensor, a pressure sensor 1127E, a temperature sensor, or the like. An air filter may be present between manifold 1115 and sensors 1127 or between vacuum pump 1130 and manifold 1115 or between ozone generator 1129 and manifold 1115 or between valves 1105 and vacuum containers 1105. An air filter may comprise, for example, one or more of a fiber filter, an activated charcoal filter, a membrane, a water or liquid filter, or the like. An air filter may be used to prevent an antimicrobial or other material, whether in gas, liquid, aerosolized or other forms from clogging or contaminating valves 1110 or sensors 1127.

Equipment in control system 1111 may comprise a power source 1135. Power source 1135 may comprise a battery, an external power supply, a generator, or the like. Power source 1135 may provide power to valves 1110, sensors 1127, vacuum pump 1130, ozone control device 1200, ethylene control device 1300, pressure control device 1400, other control device(s) 1500, and other equipment on and components of control system 1111 and shipping or storage container 1160, through electrical lines, not illustrated.

Manifold 1115 may be a space, pipe, or volume into or from which other pipes or vacuum tubes connect and which is generally sealed against uncontrolled entry of gas or liquid.

Vacuum pump 1130 may be, for example, a scroll compressor, a piston compressor or pump, a turbine pump, or the like, suitable to develop low absolute pressure in vacuum container 1105.

As illustrated in FIG. 10, the control system 1111 may connect to network 1150. Network 1150 in FIG. 10 may comprise computers, network connections among the computers, and software routines to enable communication between the computers over the network connections. Examples of network 1150 comprise an Ethernet network, the Internet, and or a wireless network, such as a GSM, TDMA, CDMA, EDGE, HSPA, LTE, satellite service, or other network provided by a wireless service provider. Connection to network 1150 may be via a Wi-Fi or wired connection. More than one network may be involved in a communication session between the illustrated devices. Connection to network 1150 may require that the computers execute software routines that enable, for example, the seven layers of the OSI model of computer networking or equivalent in a wireless phone network. Connection to network 1150 may occur transiently and or opportunistically, such as when shipping or storage container 1160 arrives or departs a destination, when shipping or storage container 1160 is opened, when a satellite connection is available, or the like. Ozone control device 1200 may connect to an ozone generator.

Shipper or storage party 1140 in FIG. 10 may comprise computers of a shipping, freight forwarding, storage party, or the like company or organization, which party may have a financial or other interest in the status of shipping or storage container 1160 and or of vacuum container 1105. Computers of shipper or storage party 1140 may be stationary or may be present on a shipping vessel, such as a boat or a truck. Computers of shipper or storage party 1140 may form a network connection with ozone control device 1200, either directly or indirectly, such as, for example, through network 1150. Monitor 1145 in FIG. 1 may comprise computers of a grower, a purchaser, an operator of ozone control device 1200, or the like company or organization, which party may have a financial or other interest in the status of shipping or storage container 1160, ozone control device 1200, vacuum container 1105, and or of a perishable commodity therein. Shipper or storage party 1140 and or monitor 1145 may receive information regarding the status of shipping or storage container 1160, ozone control device 1200, and or of vacuum container 1105.

Figure 11:
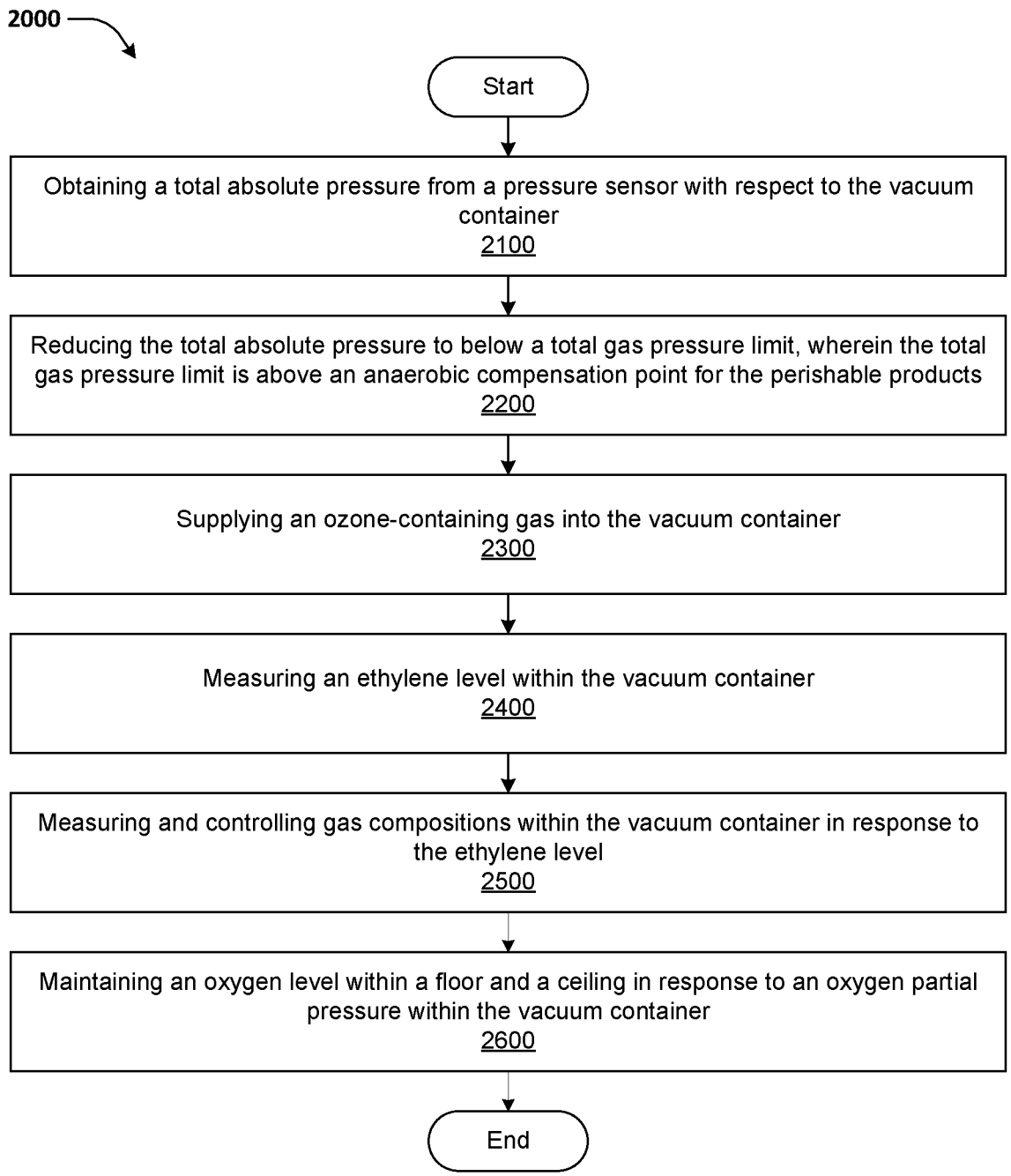
FIG. 11 is a flow chart illustrating an example of a method for storing perishable products in a vacuum container, according to some embodiments.

FIG. 11 is a flow chart illustrating an example of a method for storing perishable products in a vacuum container, according to some embodiments. Method 2000 may be performed by, for example, atmospheric control device(s), pressure management device(s), according to some embodiments. Atmospheric control devices and pressure management devices may be performed by or with assistance from a hardware accelerator. At block 2100, method 2000 may include obtaining a total absolute pressure from a pressure sensor with respect to the vacuum container, wherein the vacuum container is configured to store perishable products and wherein the vacuum container is coupled to a vacuum pump. At block 2200, method 2000 may include reducing the total absolute pressure to below a total gas pressure limit, wherein the total gas pressure limit is above an anaerobic compensation point for the perishable products. At block 2300, method 2000 may include supplying an ozone-containing gas into the vacuum container. At block 2400, method 2000 may include measuring an ethylene level within the vacuum container. In an embodiment, the ethylene level may be measured by an ethylene sensor coupled to the vacuum container. In another embodiment, the ethylene level within the vacuum container may be measured by a weight of the perishable products and a time of perishable products storage in the vacuum container. In yet another embodiment, the ethylene level within the vacuum container may be measured by a respiration of oxygen consumed and carbon dioxide produced.

At block 2500, method 2000 may include measuring and controlling gas compositions within the vacuum container in response to the ethylene level. At block 2500, method 2000 may include maintaining an oxygen level within a floor and a ceiling in response to an oxygen partial pressure within the vacuum container.

Following are non-limiting examples:

Example 1: system and apparatus for storing perishable products in a vacuum container. Embodiments may include a vacuum container configured to contain perishable products, wherein the vacuum container has a plurality of vacuum chambers. Embodiments may include an atmosphere control system coupled to the vacuum container for measuring and maintaining controlled atmospheric conditions within the vacuum container. In some embodiments, the atmosphere control system may include monitors configured to monitor atmospheric conditions within the vacuum container, wherein monitors include a pressure sensor, an oxygen sensor, and an ozone sensor, a vacuum pump configured to reduce total absolute pressure in the vacuum chamber to below a total gas pressure limit, an ozone generator configured to generate gaseous ozone, and an inlet valve coupled to the ozone generator and configured to admit an ozone-containing gas into the vacuum container. In some embodiments, the apparatus may further include a computer processor and a memory, wherein the computer processor is configured to execute instructions stored in the memory to obtain a total absolute pressure within the vacuum container via the pressure sensor, modify and maintain the atmospheric conditions within the vacuum container in response to sample values sensed by the monitors.

Embodiments may further include a manifold coupled to the vacuum chambers via chamber valves. In some embodiments, the monitors may further include a carbon dioxide sensor and a temperature sensor. Embodiments may include external monitors that monitor external atmospheric conditions outside of the vacuum container. In some embodiments, the vacuum container may be formed from a non-metallic material and is substantially airtight.

Example 2: method for storing perishable products in a vacuum container. Embodiments may include obtaining a total absolute pressure from a pressure sensor with respect to the vacuum container, wherein the vacuum container is configured to store perishable products, and wherein the vacuum container is coupled to a vacuum pump. Embodiments may include reducing the total absolute pressure to below a total gas pressure limit, wherein the total gas pressure limit is above an anaerobic compensation point for the perishable products. In some embodiments, method may further include supplying an ozone-containing gas into the vacuum container, measuring an ethylene level within the vacuum container via an ethylene sensor coupled to the vacuum container, monitoring and controlling gas compositions within the vacuum container in response to the ethylene level, and maintaining an oxygen level within a floor and a ceiling in response to an oxygen partial pressure within the vacuum container.

Example 3: system, apparatus, and method for suppressing pathogens postharvest in a vacuum container. Embodiments may include a vacuum container configured to contain perishable products, wherein the vacuum container has a plurality of vacuum chambers. Embodiments may include an atmosphere control system coupled to the vacuum container for measuring and maintaining controlled atmospheric conditions within the vacuum container. In some embodiments, the atmosphere control system may be configured to supply an ozone-containing gas into the vacuum container and control an ozone level for a period of time depending on the requirements of the perishable products (e.g., in a range between 1-24 hours). The ozone concentration may be maintained at a range between 0.05 uL/L to 200 ml/L (about 50 ppb to $2 \times 10^5$ ppm). The ozone-containing gas may be supplied to the vacuum container before or after placing the perishable in the vacuum container. The supply of the ozone-containing gas may be placed once or multiple times during the storage, depending on the stored perishable products.

Example 4: system, apparatus, and method for reducing growth hormones such as ethylene. In addition to the embodiments disclosed in Examples 1 and 2, according to some embodiments, the apparatus may include an ethylene sensor configured to monitor an ethylene level within the vacuum container. In another embodiment, the ethylene level may be calculated by obtaining an expected ethylene level from a weight of the perishable products and a time of storage in the vacuum container. In yet another embodiment, the ethylene level may be calculated by measuring the ethylene level within the vacuum container comprises measuring a respiration of oxygen consumed and carbon dioxide produced. Embodiments may include admitting an amount of ozone generated from the ozone generator in response to the ethylene level or from a calculated amount related to the amount of perishable in the vacuum chamber and/or its respiration. The ozone may be admitted to the manifold or directly to the vacuum container via valves. Embodiments may further include a humidity control system configured to control a relative humidity within the vacuum container. Embodiments may include a carbon dioxide control system configured to control the carbon dioxide concentration within the vacuum container. The reaction of ozone and ethylene produces excessive water and carbon dioxide. The humidity control system and carbon dioxide control system can assist with the abatement of ethylene in the vacuum chamber.

Example 5: system, apparatus, and method for reducing pesticide residues within a vacuum container. In addition to the embodiments disclosed in Examples 1 and 2, according to some embodiments, the apparatus may include a pesticide residue monitor system. In some embodiments, the pesticide residue monitor system is configured to obtain a sample value of a residue within the vacuum container and send the sample value of the residue to the atmosphere control system. The residue can be from a wide range of pesticides, such as ethyl formate, pyrimethanil, cyprodinil, and fludioxonil. The sample value of the residue may be a calculated amount related to the amount of the perishable in the vacuum chamber, the pesticide's expected rate of decay at a given temperature and ozone exposure, and the amount of ozone previously introduced into the vacuum chamber. In some embodiments, the atmosphere control system modifies the atmospheric conditions within the vacuum container in response to the sample value of the residue. In some embodiments, the atmosphere control system may be configured to supply an ozone-containing gas into the vacuum container and control an ozone level for a period depending on the requirements of the perishable products (e.g., in a range between 1-24 hours). The ozone concentration may be maintained at a range between 0.05 μL/L to 200 mL/L (about 50 ppb to $2 \times 10^5$ ppm). The ozone-containing gas may be supplied to the vacuum container before or after placing the perishable in the vacuum container. For instance, it is preferred to supply ozone-containing gas prior to placing the perishable to reduce fludioxonil. On the other hand, it is preferred to supply the ozone-containing gas after placing the perishable to reduce ethyl formate. The supply of the ozone-containing gas may be placed once or multiple times during the storage, depending on the stored perishable products.

Example 7: system, apparatus, and method for controlling a relative humidity within a vacuum container. In addition to the embodiments disclosed in Examples 1 and 2, according to some embodiments, the apparatus may include a humidity sensor. Embodiments may include an atmosphere control system configured to monitor and control a relative humidity within the vacuum container.

Example 6: system, apparatus, and method for disinfecting vacuum lines for postharvest storage. In addition to the embodiments disclosed in Examples 1 and 2, according to some embodiments, the atmosphere control system may be configured to supply an ozone-containing gas into the vacuum container, a manifold connected to the vacuum container, and vacuum tubes and control the ozone level for a pre-determined period. This may prevent any airborne pathogens (e.g., *Penicillium* species) from being introduced into the vacuum container or spread between the vacuum chambers. The introduction of ozone in the vacuum lines can also disinfect the surface of the equipment, thus reducing non-airborne pathogens (e.g., *Botrytis*) in the vacuum lines. The ozone concentration may be maintained at a range between 0.05 μL/L to 200 mL/L (about 50 ppb to $2 \times 10^5$ ppm). The ozone-containing gas may be supplied to the vacuum container before or after placing the perishable in the vacuum container. The supply of the ozone-containing gas may be placed once or multiple times during the storage, depending on the stored perishable products.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

The invention claimed is:

1. An apparatus for storing perishable products, comprising:
   a vacuum container configured to contain perishable products, wherein the vacuum container has a plurality of vacuum chambers; and
   an atmosphere control system coupled to the vacuum container for measuring and maintaining controlled atmospheric conditions within the vacuum container, the atmosphere control system comprising:
      a plurality of monitors configured to monitor atmospheric conditions within the vacuum container, wherein the plurality of monitors include a pressure sensor, an oxygen sensor, and an ozone sensor, and wherein the pressure sensor is configured to obtain a total absolute pressure in the plurality of vacuum chambers;
      a vacuum pump configured to reduce the total absolute pressure in the plurality of vacuum chambers to below a total gas pressure limit;
      an ozone generator configured to generate gaseous ozone;
      an inlet valve coupled to the ozone generator and configured to admit an ozone-containing gas into the vacuum container; and
      a microprocessor and a memory, wherein the microprocessor is configured to execute instructions stored in the memory to measure and control the atmospheric conditions within the vacuum container in response to sample values sensed by the plurality of monitors.

2. The apparatus of claim 1, wherein the atmosphere control system is further configured to reduce the total absolute pressure in the plurality of vacuum chambers to a range between 0 and 200 mbar via the vacuum pump.

3. The apparatus of claim 1, wherein the atmosphere control system further comprises an ethylene sensor configured to measure an ethylene level within the vacuum container.

4. The apparatus of claim 3, wherein the atmosphere control system is further configured to admit an amount of ozone generated from the ozone generator in response to the ethylene level.

5. The apparatus of claim 1, wherein the atmosphere control system is further configured to determine an expected ethylene level within the vacuum container by a weight of the perishable products and a time of perishable products storage in the vacuum container.

6. The apparatus of claim 1, wherein the atmosphere control system is further configured to determine an ethylene level within the vacuum container by measuring a respiration of oxygen consumed and carbon dioxide produced.

7. The apparatus of claim 1, the apparatus further comprises a pesticide residue monitor system, the pesticide residue monitor system comprising sensors configured to obtain a sample value of a residue within the vacuum container and send the sample value of the residue to the atmosphere control system, and wherein the atmosphere control system modifies the atmospheric conditions within the vacuum container in response to the sample value of the residue.

8. The apparatus of claim 1, wherein the atmosphere control system is further configured to:
   determine an estimated residue on the perishable products related to an amount of perishable products in the vacuum container, a rate of decay of the residue, and an amount of ozone introduced into the vacuum container; and
   modify the atmospheric conditions within the vacuum container in response to the estimated residue on the perishable products.

9. The apparatus of claim 1, wherein the plurality of monitors further include a carbon dioxide sensor, wherein the atmosphere control system measures and controls a carbon dioxide level within the vacuum container in response to a carbon dioxide sample value from the carbon dioxide sensor.

* * * * *